(12) United States Patent
Danet et al.

(10) Patent No.: US 9,703,556 B2
(45) Date of Patent: Jul. 11, 2017

(54) METHOD FOR CONTROLLING AN INTEGRATED CIRCUIT, INTEGRATED CIRCUIT AND COMPUTER INCLUDING AN INTEGRATED CIRCUIT

(75) Inventors: Bertrand Danet, Toulouse (FR); Stéphane Laborie-Fulchic, Beaupuy (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 864 days.

(21) Appl. No.: 13/876,628

(22) PCT Filed: Aug. 18, 2011

(86) PCT No.: PCT/EP2011/004169
§ 371 (c)(1),
(2), (4) Date: May 29, 2013

(87) PCT Pub. No.: WO2012/052080
PCT Pub. Date: Apr. 26, 2012

(65) Prior Publication Data
US 2013/0238274 A1    Sep. 12, 2013

(30) Foreign Application Priority Data

Oct. 18, 2010    (FR) ..................... 10 04078

(51) Int. Cl.
*G06F 9/22*    (2006.01)
*G06F 9/44*    (2006.01)
(52) U.S. Cl.
CPC ............. *G06F 9/22* (2013.01); *G06F 9/441* (2013.01)

(58) Field of Classification Search
CPC ... G06F 9/22; G06F 9/441; G06F 8/65; G06F 13/102; G06F 13/385
(Continued)

(56) References Cited

U.S. PATENT DOCUMENTS 6,366,975 B1    4/2002  Nakajima
8,219,978 B2 *  7/2012  Gamou ................... G06F 21/51
                                              717/126

(Continued)

FOREIGN PATENT DOCUMENTS

CN    1205788    1/1999
CN    1236131    11/1999
(Continued)

OTHER PUBLICATIONS

International Search Report, dated Oct. 4, 2011, from corresponding PCT application.

*Primary Examiner* — Gregory J Toatley
*Assistant Examiner* — Yoshihisa Ishizuka
(74) *Attorney, Agent, or Firm* — Young & Thompson

(57) ABSTRACT

The present invention relates to a method (50) for controlling an integrated circuit (20) comprising a microprocessor, in which the integrated circuit (20) is configured to execute by default a general program, said integrated circuit being controlled by activation of a mode of operation of the integrated circuit, called "bootstrap mode", in which said integrated circuit (20) executes a program for loading a specific program to be executed. The method (50) comprises:
  i) a step (51) of sending at least one bootstrap mode activation message to a test module (200) of the integrated circuit (20) via a test bus (310),
  ii) a step (52) of activating the bootstrap mode of the integrated circuit (20), executed by the test module (200) of the integrated circuit (20), and (Continued)

iii) a step (53) of loading the specific program via a communication bus (320) different from the test bus (310). The present invention also relates to an integrated circuit (20) and a computer (30) including such an integrated circuit (20).

13 Claims, 2 Drawing Sheets

(58) Field of Classification Search
USPC .................................................. 702/123
See application file for complete search history.

(56) References Cited

U.S. PATENT DOCUMENTS

| | | |
|---|---|---|
| 8,332,623 B2 | 12/2012 | Tsai |
| 2007/0113088 A1* | 5/2007 | Volp ...................... G06F 9/4405 |
| | | 713/169 |
| 2008/0129313 A1* | 6/2008 | Iwamoto .......... G01R 31/31907 |
| | | 324/555 |
| 2009/0172383 A1 | 7/2009 | Cumming et al. |
| 2010/0011202 A1 | 1/2010 | Murawski et al. |
| 2010/0070749 A1 | 3/2010 | Tsai |
| 2010/0299510 A1* | 11/2010 | Ueltschey ............. G06F 21/575 |
| | | 713/2 |

FOREIGN PATENT DOCUMENTS

| | | | |
|---|---|---|---|
| CN | 101488091 A | 7/2009 | |
| EP | 0 884 598 A1 | 12/1998 | |
| GB | 2337616 | 11/1999 | |
| TW | 201011649 | 3/2010 | |
| WO | 01/29677 A2 | 4/2001 | |
| WO | 2008/049060 A2 | 4/2008 | |
| WO | WO 2008049060 A2 * | 4/2008 | ............... G06F 8/65 |

* cited by examiner

METHOD FOR CONTROLLING AN INTEGRATED CIRCUIT, INTEGRATED CIRCUIT AND COMPUTER INCLUDING AN INTEGRATED CIRCUIT

BACKGROUND OF THE INVENTION

Field of the Invention

The present invention belongs to the field of electronic circuits, and relates more particularly to the control of microprocessor integrated circuits.

Description of the Related Art

A microcontroller is one example of a programmable integrated circuit comprising, in addition to one or more microprocessors, memories (flash, ROM, EEPROM, RAM, etc.), interface peripherals, etc.

On startup, a microcontroller executes a bootstrap program, consisting of code instructions which can be executed by a microprocessor.

Such a bootstrap program is stored in a nonvolatile memory, for example a ROM memory (Read-Only Memory), and makes it possible to initiate by default the execution of a more complex general program suitable for performing the various functions provided for the microcontroller.

In particular, in embedded systems, the microcontroller can also be configured to execute a program for loading a specific program. The specific program makes it possible in particular to modify the general program by modifying the content of a nonvolatile memory in which all or part of said general program is stored.

The mode in which said microcontroller executes the loading program (known by the name "bootstrap loader" in the literature) is hereinafter designated "bootstrap mode".

The bootstrap mode is activated by biasing ports (fins, leads, etc.) of the microcontroller, that is to say by applying predetermined signals to said ports, which will be interpreted by the microcontroller as a bootstrap mode activation command.

These ports are more often than not dedicated to the activation of the bootstrap mode.

While the bootstrap mode is activated frequently in the integration/validation phase of the microcontroller, such is no longer the case when said microcontroller is included in a finished product, for example a motor vehicle computer. The bootstrap mode is then activated only in the event of failure and return of the computer to the manufacturer for failure analysis.

It will therefore be understood that, by dedicating certain ports to the activation of bootstrap mode, the result is an inefficient use of the ports of the microcontroller, which is all the more detrimental since the number of ports of a microcontroller is generally limited.

It is known practice to provide shared ports implemented both for the activation of the bootstrap mode and for inputs/outputs of the microcontroller. The problem with such an approach lies in the fact that it is very complex in practice to have both the activation of the bootstrap mode and inputs/outputs of the microcontroller coexist on one and the same port.

On the one hand, the signals that can be received on such ports can have very different characteristics (voltage, clock frequency, etc.) depending on whether they are bootstrap mode activation signals or input/output signals, so that the processing by the microcontroller of these signals proves complex and requires a great number of logic circuits.

Also, the coexistence with equipment items which access these ports as inputs/outputs of the microcontroller raises the problem of the electrical insulation of these equipment items, as well as that of avoiding having signals applied by these equipment items to these ports being interpreted erroneously as an activation of the bootstrap mode. In practice, in the case of a motor vehicle, an erroneous activation of the bootstrap mode could cause the control of said motor vehicle to be lost to its passengers.

BRIEF SUMMARY OF THE INVENTION

The aim of the present invention is in particular to reduce the number of ports needed for the activation of the bootstrap mode, while limiting modifications to be made to the existing integrating circuits.

According to a first aspect, the present invention relates to a method for controlling an integrated circuit comprising a microprocessor. The integrated circuit is configured to execute by default a general program. The expression "control of the integrated circuit" should be understood to mean an activation of the bootstrap mode and the loading of a specific program to be executed. The control method comprises:
- a step of sending at least one bootstrap mode activation message to a test module of the integrated circuit via a test bus,
- a step of activating the bootstrap mode of the integrated circuit, executed by the test module of the integrated circuit,
- a step of loading the specific program via a communication bus different from the test bus.

According to particular implementations, the method comprises one or more of the following features, taken in isolation or in all technically possible combinations:
- the integrated circuit being suitable for loading the specific program via a plurality of communication buses, the at least one message comprises an identifier of the communication bus to be used during the loading step,
- the activation of the bootstrap mode is executed by a non-lockable function of the test module, a lockable function being a function whose execution can be blocked by configuration of the test module,
- the method comprises an authentication step prior to any exchange of data with the test module,
- the test module is a JTAG module.

According to a second aspect, the present invention relates to an integrated circuit comprising a microprocessor. The integrated circuit is configured to execute by default a general program and to load a specific program to be executed when it is in a bootstrap mode. The integrated circuit comprises a test module suitable for activating the bootstrap mode when it receives at least one message to activate said bootstrap mode via a test bus. The integrated circuit is configured to load the configuration program via a communication bus different from the test bus.

According to particular embodiments, the integrated circuit comprises one or more of the following features, taken in isolation or in all technically possible combinations:
- the test module is a JTAG module,
- the at least one activation message comprises a specific JTAG control instruction.

According to a third aspect, the present invention relates to a computer comprising at least one integrated circuit according to any embodiment of the invention, and comprises an adaptation unit between the test bus and an activation bus. Preferably, the adaptation bus comprises fewer tracks than the test bus.

BRIEF DESCRIPTION OF THE DRAWINGS

The invention will be better understood on reading the following description, given as a nonlimiting example, and with reference to the figures which represent.

DETAILED DESCRIPTION OF THE PREFERRED EMBODIMENTS

Figure 1:
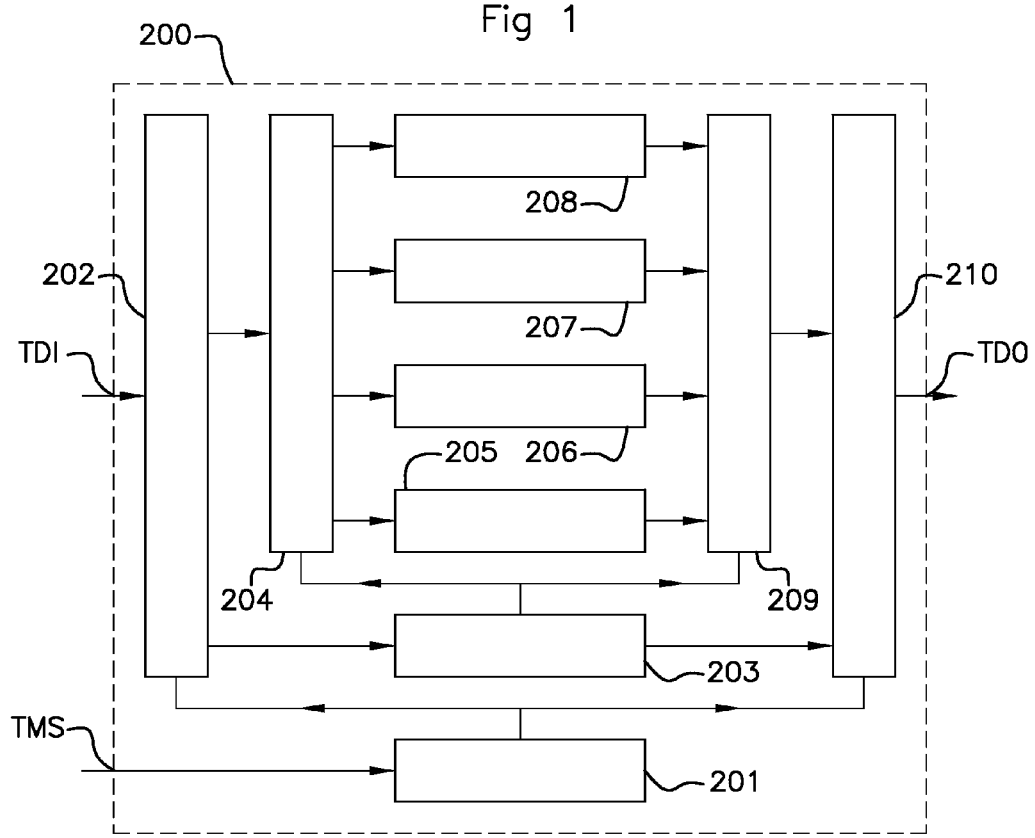
FIG. 1: a schematic representation of an exemplary embodiment incorporating a JTAG module according to the invention.

The present invention relates to a method 50 for controlling a programmable integrated circuit, as well as a programmable integrated circuit 20 and a computer 30, comprising this programmable integrated circuit.

The expression "programmable integrated circuit" should be understood to mean an integrated circuit, comprising one or more microprocessors, which, when its bootstrap mode is activated, executes a loading program ("bootstrap loader") for a specific program, different from the general program. Within the meaning of the invention, the control of an integrated circuit corresponds to all the operations to be performed for an integrated circuit to execute a specific program (to be loaded into memory) instead of the general program.

The specific program can be implemented to perform various tests, including modifying all or part of the general program by modifying a nonvolatile memory in which all the instruction codes forming said general program are stored. The specific program can also be implemented to modify a configuration program for a programmable logic circuit (FPGA, PLD, EPLD, etc.) which may be external to the programmable integrated circuit.

The invention finds an application that is particularly advantageous, although in no way limiting, in the integrated circuits distributed on a large scale (motor vehicle computers, mobile telecommunication terminals, etc.) for which the constraints of cost, robustness and optimization of the resources (in particular of the ports) are very important.

According to the invention, the activation of the bootstrap mode of an integrated circuit 20 is performed by implementing a test module 200 of the integrated circuit 20.

Most integrated circuits are these days provided with at least one test module to check the operation of said integrated circuits during the integration/validation of said integrated circuits. The test modules are generally retained in the integrated circuit after validation. On the one hand, this makes it possible to avoid introducing modifications to the integrated circuit after having validated it and, on the other hand, this makes it possible to retain the possibility of testing the integrated circuit in the event of failure or of return to the manufacturer for analysis.

There are numerous examples of such test modules. Among those that can be cited as examples are the following test modules: JTAG, BDM, BSC, OCDS, DAP, NEXUS, etc.

In a preferred embodiment of the integrated circuit 20 and implementation of the control method 50, the test module 200 is a JTAG (Joint Test Action Group) module, that is to say a module compatible with the IEEE 1149 standard "Standard Test Access Port and Boundary Scan Architecture", described in particular in the specification IEEE Std. 1149.1-1990.

Hereinafter in the description, the case where the test module 200 is a JTAG module 200 will be adopted as a nonlimiting case. There is nothing to preclude, according to other examples not detailed, considering other types of test modules.

FIG. 1 schematically represents a nonlimiting exemplary embodiment of a JTAG module 200 modified according to the invention.

As is known, an integrated circuit comprising a JTAG module is provided with a number of test-dedicated ports coupled to the JTAG module.

In practice, the integrated circuits take the form of an electronic chip mounted in a package. The electronic chip is also electrically coupled to leads or pins arranged on the outside of said package. In the context of the invention, the term "port" should be understood to mean a lead or a pin, or any other type of suitable electrical contact.

In the case of a JTAG module 200, the integrated circuit 20 generally comprises 4 to 5 ports dedicated to the test functions, linked to a test bus 310. The ports associated with a JTAG module 200 are as follows:

TDI ("Test Data Input"): data input,
TDO ("Test Data Output"): data output,
TMS ("Test Mode Select"): selection of the test mode,
TCK ("Test ClocK"): clock,
TRST ("Test ReSeT", optional): reset.

The role and the usage mode of each of these ports is considered to be known to the person skilled in the art, and is also detailed in the specification IEEE Std. 1149.1-1990. For the sake of legibility of the figures, only the TDI, TDO and TMS ports are represented therein.

As represented in FIG. 1, a JTAG module 200 notably comprises a state machine 201, that is to say a synchronous logic circuit suitable for controlling the operation of said JTAG module.

The TDI input port is coupled to a demultiplexer circuit 202, which separates the signals received on the TDI port. A control instruction is transmitted to an instruction register 203, and data are transmitted to another demultiplexer circuit 204. The data are routed to data registers associated with the value of the control instruction in the instruction register 203.

For example, the standard IEEE 1149 provides data registers 205 and 206 known by the respective names of "BYPASS" (associated with the "BYPASS" control instruction) and "IDCODE" (associated with the "IDCODE" control instruction), considered to be known to the person skilled in the art.

The standard IEEE 1149 also provides data registers associated with test functions, such as, for example, a so-called "boundary scan" function 207, also considered to be known to the person skilled in the art.

The standard IEEE 1149 also provides the possibility, for each manufacturer, to define its own control instructions and the associated test functions.

According to the invention, the JTAG module 200 comprises a new test function 208 for the activation of the bootstrap mode of the integrated circuit 20.

In the example represented, and in a conventional manner, the outputs of the different test functions and registers are then multiplexed by means of a multiplexer circuit 209, which are in turn multiplexed with the control instruction by means of another multiplexer circuit 210. The output of the multiplexer circuit 210 is, for example, linked to the TDO output port.

Figure 2A:
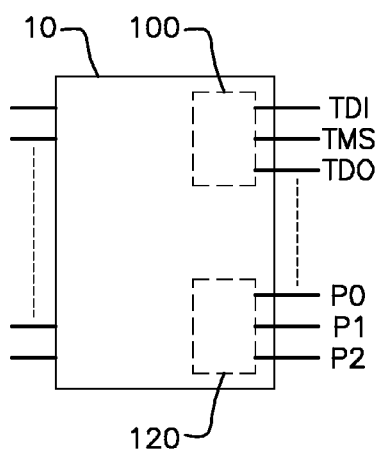
FIG. 2a: a schematic representation of a programmable integrated circuit according to the prior art.

FIG. 2a schematically represents an integrated circuit 10 according to the prior art. The integrated circuit 10 comprises ports, designated P0, P1 and P2, dedicated to the activation of the bootstrap mode. The ports P0, P1, P2 constitute, in the prior art, a bootstrap mode activation interface.

The integrated circuit 10 comprises a bootstrap mode activation module 120, coupled to the ports P0, P1, P2. It also comprises a test module 100, a JTAG module in the example represented, coupled to the TDI, TDO and TMS ports (which constitute a test interface of the integrated circuit 10).

Figure 2B:
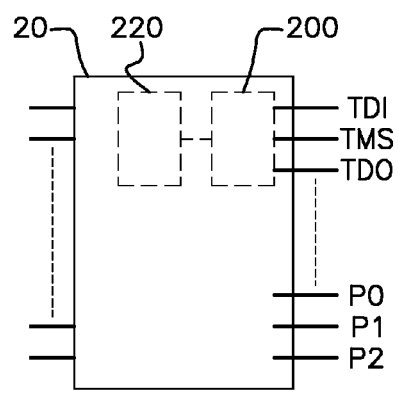
FIG. 2b: a schematic representation of a programmable integrated circuit according to the invention.

FIG. 2b schematically represents the integrated circuit 20 incorporating a JTAG module 200 modified according to the invention, as illustrated by FIG. 1. The integrated circuit 20 comprises a module 220 for activating the bootstrap mode of said integrated circuit, coupled to the JTAG module 200 and controlled by the activation function 208 of said JTAG module 200. The module 220 for activating the bootstrap mode fulfils substantially the same functions as the bootstrap mode activation module 120 according to the prior art.

As illustrated in FIG. 2b, the ports P0, P1 and P2 are available to add other functionalities to the integrated circuit 20, the bootstrap mode activation interface now being the test interface (ports TDI, TDO, TMS, etc.) of the integrated circuit 20.

The integrated circuit 20 is also configured, when the bootstrap mode has been activated by the activation function 208 added to the JTAG module 200, to load the specific program via a communication bus 320 different from the test bus 310. In this way, the JTAG module 200 is used only for the activation of the bootstrap mode and not for the loading of the specific program.

The communication bus 320 can be of any type suitable for loading a specific program, and depends on the types of communication bus supported by the integrated circuit 20. Examples that can be cited are the communication buses of serial synchronous/asynchronous, CAN (Controller-Area Network), FlexRay, Ethernet, and other such types.

The implementation of a communication bus 320 different from the test bus 310 offers the advantage of limiting the modifications to be made to the existing JTAG modules, inasmuch as the JTAG module 200 is not implemented for loading the specific program.

Furthermore, this makes it possible to also limit the modifications to be made to the existing bootstrap mode activation modules, inasmuch as the loading of the specific program can continue to be done via the same communication bus as previously. Only the activation of the bootstrap mode is done via the test interface (ports TDI, TDO, TMS, etc.) in order to free up the ports P0, P1 and P3.

Figure 3:
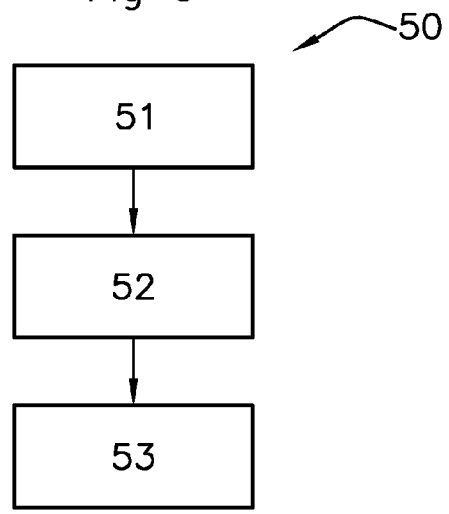
FIG. 3: a diagram illustrating the main steps of a method for controlling an integrated circuit according to the invention.

FIG. 3 schematically represents the main steps of a method 50 for controlling an integrated circuit 20 according to the invention, said steps being:

- a step 51 of sending at least one bootstrap mode activation message to the JTAG module 200 of the integrated circuit 20 via the test bus 310,
- a step 52 of activating by the activation function 208 of the JTAG module 200, the bootstrap mode of the integrated circuit 20,
- a step 53 of loading the specific program via a communication bus 320 different from the test bus 310.

The at least one bootstrap mode activation message notably comprises a predetermined control instruction, associated with the bootstrap mode activation function 208, introduced into the JTAG module 200.

Preferably, the loading program, executed when the integrated circuit 20 is in bootstrap mode, is suitable for loading the specific program via the plurality of different communication buses 320 (serial synchronous/asynchronous, CAN, FlexRay, Ethernet, etc.). In this case, the at least one message comprises an identifier of the communication bus 320 to be used, out of all the available communication buses, during the step 53 of loading the specific program, and the function 208 activates the bootstrap mode for a loading via the selected communication bus 320.

Preferably, the activation function 208, introduced into the JTAG module 200, is a non-lockable function.

It is known practice to provide for certain test functions of a JTAG module 200 to be locked once the integrated circuit is mounted in the final product (for example a motor vehicle computer). The expression "locked test function" should be understood to mean that the JTAG module 200 is configured, in the integrated circuit 20 of the final product, so as to no longer be able to execute said locked test function. The mechanisms for locking test functions of a JTAG module are considered to be known to the person skilled in the art.

In the event of failure of the integrated circuit 20 in the final product, it may prove necessary to have to reprogram said integrated circuit, so that the bootstrap mode activation function 208 has to be able to be executed, including in the final product. It will therefore be understood that it is advantageous to have a non-lockable activation function 208.

Figure 4:
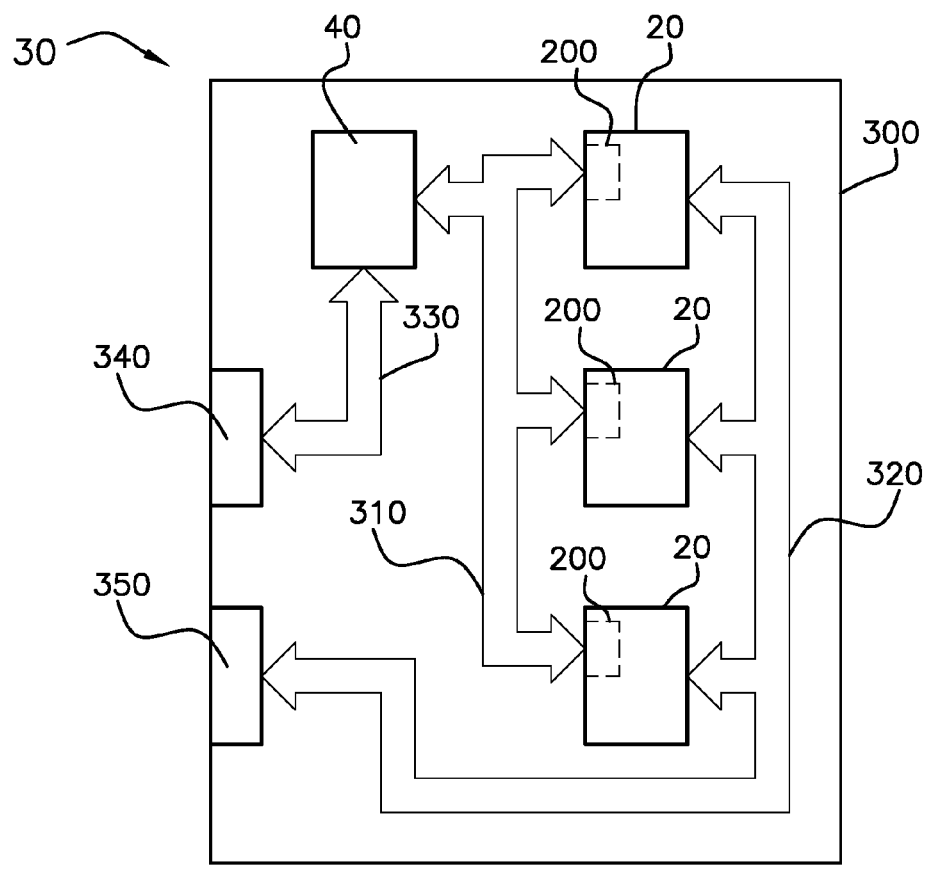
FIG. 4: a schematic representation of a preferred embodiment of a computer according to the invention.

FIG. 4 represents an exemplary embodiment of a computer 30 comprising a plurality of integrated circuits 20 mounted on a printed circuit 300.

The integrated circuits 20 are linked to the test bus 310, and each comprise a JTAG module 200 modified according to the invention. Furthermore, said integrated circuits 20 are linked to at least one communication bus 320.

Preferably, the at least one message, transmitted during the sending step 51 of the control method 50, comprises an identifier of the integrated circuit 20 for which the bootstrap mode has to be activated. It will therefore be understood that it is possible to separately activate the bootstrap mode of each integrated circuit 20 comprising a modified JTAG module 200, via the same test bus 310. The loading of the specific program for an integrated circuit is performed via a communication bus 320 different from the test bus 310.

In a preferred embodiment, the computer 30 comprises an adaptation unit 40 linked to the test bus 310. This preferred embodiment is illustrated by FIG. 4 in the case of a computer 30 comprising three integrated circuits 20 according to the invention, but it will be understood that this embodiment is applicable to any number of such integrated circuits 20.

The adaptation circuit 40 is, for example, a microcontroller and/or a programmable logic circuit. The adaptation unit 40 is configured to perform an adaptation between, on the one hand, the test bus 310 and, on the other hand, an activation bus 330 comprising fewer tracks than the test bus 310.

The test bus 310, for a JTAG module 200, generally comprises 4 to 5 tracks, respectively linked to the TDI, TDO, TMS, TCK and TRST ports.

The activation bus 330 is linked to a connector 340. The activation bus 330 is preferably a communication bus comprising a single track, such as, for example, a serial asynchronous bus, so that the connector 340 can comprise only a single port.

The communication bus 320 is linked to a connector 350 which is, in the example represented, distinct from the connector 340. There is nothing to preclude, according to other examples not represented, having one and the same connector for the test bus 310 and the communication bus 320.

The adaptation unit 40 is configured to exchange data, over the test bus 310, with the JTAG module 200 of each integrated circuit 20 by implementing the JTAG communication protocol, defined, for example, by the specification IEEE Std. 1149.1-1990. The adaptation unit 40 is also configured to exchange data with an equipment item (not represented in the figures) linked to the connector 340, by implementing a communication protocol different from the JTAG communication protocol.

The adaptation unit 40 therefore provides an adaptation that is both physical and functional between the activation bus 330 and the test bus 310. In practice, the adaptation unit 40 notably handles the conversion between, on the one hand, signals formatted in accordance with the communication protocol used on the activation bus 330 and, on the other hand, signals formatted in accordance with the JTAG communication protocol.

Such a computer 30, incorporating an adaptation unit 40, offers the advantage of making it possible to activate the bootstrap mode via an activation bus 330 comprising fewer tracks than the test bus 310. This reduction of the number of tracks is accompanied by a reduction in the number of ports (or electrical contacts) of the connector 340.

In the particular case of a motor vehicle computer, the computer 30 generally comprises a seal-tight box, not represented in the figures, inside which the printed circuit 300 is arranged. The box of the computer 30 also comprises external connection means, which are linked to connectors of the printed circuit 300.

The number of ports (electrical contacts) of the external connection means is an important factor because, in the case of a motor vehicle computer 30, said connection means have to be able to withstand significant stresses, notably of temperature and humidity. The addition of a port to these external connection means is accompanied by a not inconsiderable increase in the manufacturing cost. It will therefore be understood that the number of ports has to be kept to a minimum.

It will be understood that, according to the invention, the use of the JTAG module 200 for activating the bootstrap mode of an integrated circuit 20 makes it possible to free up ports of this integrated circuit 20. However, in the case of a computer 30 comprising a seal-tight box, it would then be necessary to add 4 to 5 ports to the external connection means, respectively linked to TDI, TDO, TMS, TCK and TRST ports. Because of the adaptation unit 40, the number of ports of the external connection means, for activating the bootstrap mode from outside the sealed box of the computer 30, can be reduced to one.

It should be noted that the external connection means are linked to at least one communication bus 320 of the computer 30 for the loading of the specific program. In the case of the computer 30 of FIG. 4, the external connection means are, for example, linked to the connector 340 and to the connector 350.

In a particular embodiment, the communication protocol used on the activation bus 330 is a secure protocol, requiring a prior authentication before any exchange of data with the JTAG module 200. The authentication can implement any type of authentication algorithm known to the person skilled in the art.

If appropriate, the control method 50 comprises a step, prior to any exchange of data with the JTAG module 200, of authentication of the sender of messages received by the adaptation unit 40.

Preferably, the data exchanged over the activation bus 330 are encrypted once the authentication has been successfully completed. The encryption can implement any type of encryption algorithm known to the person skilled in the art.

The authentication and, if appropriate, the encryption, make it possible to prevent access to the JTAG module 200 by an unauthorized person. Furthermore, that makes it possible to limit the risks of erroneous activation of the bootstrap mode of an integrated circuit 20 linked to the adaptation unit 40 via the test bus 310.

The invention claimed is:

1. A method for controlling an integrated circuit comprising a microprocessor, in which the integrated circuit is configured to execute by default a general program, said integrated circuit being controlled by activation of a mode of operation of the integrated circuit, the mode of operation being a bootstrap mode, and loading of a specific program to be executed, the method comprises:
    sending at least one bootstrap mode activation message, in the form of a predetermined control instruction associated with a test function, to a test module of the integrated circuit via a test bus;
    activating the bootstrap mode of the integrated circuit controlled by the test function, by an activation module coupled to the test module and executed by said test module of the integrated circuit; and
    loading the specific program via a communication bus different from the test bus.

2. The method as claimed in claim 1, wherein the integrated circuit is configured to load the specific program via a plurality of communication buses, the at least one message comprising an identifier of the communication bus to be used during the loading the specific program.

3. The method as claimed in claim 2, wherein the activation of the bootstrap mode is executed by a non-lockable function of the test module, a lockable function being a function whose execution is able to be blocked by configuration of the test module.

4. The method as claimed in claim 2, further comprising performing authenticating prior to any exchange of data with the test module.

5. The method as claimed in claim 1, wherein the activation of the bootstrap mode is executed by a non-lockable function of the test module, a lockable function being a function whose execution is able to be blocked by configuration of the test module.

6. The method as claimed in claim 5, further comprising performing authenticating prior to any exchange of data with the test module.

7. The method as claimed in claim 1, further comprising performing authenticating prior to any exchange of data with the test module.

8. The method as claimed in claim 1, wherein the test module is a Joint Test Action Group (JTAG) module.

9. An integrated circuit, comprising:
a microprocessor configured to execute by default a general program and to load a specific program to be executed when in an operating mode that is a bootstrap mode; and
a test module to activate the bootstrap mode when the test module receives at least one message to activate said bootstrap mode, in the form of a predetermined control instruction associated with a test function; and
at least one activation module coupled to the test module over a test bus,
wherein the integrated circuit is configured to load the configuration program via a communication bus different from the test bus.

10. The integrated circuit as claimed in claim 9, wherein the test module is a Joint Test Action Group (JTAG) module.

11. The integrated circuit as claimed in claim 10, wherein the at least one activation module comprises a specific JTAG control instruction.

12. A computer comprising:
at least one integrated circuit conforming to claim 9; and
an adaptation unit between the test bus and an activation bus.

13. The computer as claimed in claim 12, wherein the adaptation bus comprises fewer tracks than the test bus.

* * * * *